United States Patent Office.

JEROME BONAPARTE MELVIN, OF LOWELL, MASSACHUSETTS, ASSIGNOR OF TWO-THIRDS TO ROMULUS NORWOOD, OF LONDON, ENGLAND.

PROCESS OF HARDENING RESINS.

SPECIFICATION forming part of Letters Patent No. 370,640, dated September 27, 1887.

Application filed April 27, 1886. Serial No. 200,257. (No specimens.)

*To all whom it may concern:*

Be it known that I, JEROME BONAPARTE MELVIN, chemist, a citizen of the United States of America, and a resident of Lowell, Massachusetts, United States of America, have invented new and useful Improvements in the Manufacture of Resinous Compounds, of which the following is a specification.

This invention relates to the treatment of resins or resinous substances for the purpose of producing compounds thereof which will possess a greater degree of hardness, and consequently a higher melting or fusing point, than is the case with such resins or resinous substances when in their natural or normal condition; and the chief object of the said invention is to obtain at a small expense resinous compounds possessing all or most of the qualities to be found in, and therefore capable of being employed in lieu of, certain gums and other substances which are procurable only at a relatively high cost.

My invention is chiefly designed to provide a comparatively cheap substance or material which will effectually take the place of copal and other resins or resinous substances in the manufacture of varnishes of various kinds; but it will be obvious to any person having a knowledge of the subject to which the said invention relates that the compounds I produce may be used for various analogous or other purposes.

In carrying my invention into practice I prefer to employ that description of resin which is ordinarily known in commerce as "rosin," and of this material I take any desirable quantity, which I place in an ordinary melting kettle or vessel, which may be either open or closed. I heat the rosin to a sufficient temperature to melt the same, and at a time when the mass has reached a somewhat thick consistency (which will be at about 230° Fahrenheit) I introduce a certain proportion (hereinafter indicated) of oxide of zinc in the condition of powder. I stir the whole together, by means of a rod or any other convenient article, in order that the rosin and the oxide may be intimately combined. This stirring should preferably continue until the operation is terminated. When the oxide has been added, the temperature should be gradually increased till the chemical reaction commences, which will occur when the mass has reached a temperature of about 360° Fahrenheit, and which will be apparent by reason of the bubbles of gas rising to the surface. This temperature should be maintained for a few minutes—that is to say, until the mass has become thick and nearly or quite hard. No further treatment is absolutely essential, as the compound is at this stage ready for use in the manufacture of varnishes or for any other purpose to which it is applicable; but as the mass presents at this time a somewhat spongy and uneven appearance I prefer to continue the operation by raising the temperature to a sufficient degree—viz., to about 400° Fahrenheit, if the proportion of oxide be small, and to a correspondingly-higher degree, if the proportion of oxide be larger—and to maintain this temperature until the compound has become thoroughly fluid. It will then be smooth and even, and will be, when it has become cold and hard, in a more advantageous condition for sale than would be the case if this latter melting operation were not effected. It is, however, desirable to say that, as at these high temperatures rosin is highly inflammable, care must be taken to prevent the ignition thereof.

The proportion of oxide of zinc, as compared with the rosin, must be varied according to the degree of hardness which it is desired that the compound shall possess, it being borne in mind that the larger the proportion of the said oxide the harder the compound will be. The following proportions I have found advantageous in the production of resinous compounds capable of being used in lieu of comparatively expensive gums for the manufacture of varnish—viz., for every one hundred (100) parts, by weight, of rosin, either two and one-half, (2½,) five, (5,) seven and one-half, (7½,) ten, (10,) fifteen, (15,) or twenty-five (25) parts, by weight, of oxide of zinc. It will be readily understood that other proportions may be employed, according to the result desired—that is to say, more or less hardness and a higher or lower melting-point in the compound.

Although I have indicated in the above description one oxide only—viz., oxide of zinc—I desire it to be understood that I may employ in lieu thereof oxide of lead, of iron, or of manganese. If iron is used, I prefer the sesquioxide, and if manganese is used I prefer the black oxide; and it is desirable to say that when either of these last-named oxides is used in practicing my invention the resulting compound will be of a black or very dark color, and consequently will not be suitable for use in the manufacture of light-colored varnishes.

I desire it to be understood that although I prefer to employ the article known in commerce as "rosin," other resinous substances may be used with advantage—such as balsams and resinous gums; and as my object is to treat substances which can be obtained at a small cost in such a manner as to bring them into a condition to be capable of employment in place of more expensive products, the kind of resinous materials which may be used in lieu of rosin will be readily understood by all persons conversant with the subject.

It will be obvious that the compounds made according to my invention may be advantageously used in combination with coal and other tar, wax, and similar products to obtain compounds useful for many purposes.

I am aware that heretofore and prior to my invention the natural resins and balsams of the Coniferæ and the products obtained from the same, as also fresh resins and fossil resins found in commerce, attain a higher softening or melting point when the acids contained in these resins are made to combine with caustic lime or caustic alkaline earths to form salts of the same.

A method of waterproofing has also been in use, consisting in dissolving resin in "coal-tar oil" and rubbing the oxide or oxychloride of lead into the fabric. The United States Dispensatory also speaks of the capacity of copaiba to dissolve magnesia, especially by the aid of heat. The ordinary recipes for the various kinds of sealing-wax are found in Ure's Dictionary and in Wagner's Technology; but I make no claim to such processes, as they form no part of my invention.

What I claim is—

The process, hereinbefore set forth, for treating rosin and similar resinous substances, consisting in heating the resinous mass till it acquires a thick consistency, adding a zinc oxide in the proportions specified, increasing the temperature of the mixture until it is thoroughly fluid, and finally cooling, substantially as described.

In testimony whereof I have hereunto signed my name in the presence of two subscribing witnesses.

JEROME BONAPARTE MELVIN.

Witnesses:
    JOHN T. KNOWLES,
    ALBT. G. WEAVER.